US012122400B2

(12) United States Patent
Bueb et al.

(10) Patent No.: US 12,122,400 B2
(45) Date of Patent: Oct. 22, 2024

(54) VEHICLE-BASED APPARATUS FOR NOISE INJECTION AND MONITORING

(71) Applicant: Micron Technology, Inc., Boise, ID (US)

(72) Inventors: Christopher J. Bueb, Folsom, CA (US); Manjunath Chandrashekaraiah, Folsom, CA (US); Ashok Sahoo, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 647 days.

(21) Appl. No.: 17/462,626

(22) Filed: Aug. 31, 2021

(65) Prior Publication Data

US 2023/0061614 A1    Mar. 2, 2023

(51) Int. Cl.
*B60W 50/04*  (2006.01)
*B60R 16/023* (2006.01)
*B60R 16/03*  (2006.01)
*B60W 30/08*  (2012.01)
*G06F 9/48*   (2006.01)

(52) U.S. Cl.
CPC ....... *B60W 50/045* (2013.01); *B60R 16/0231* (2013.01); *B60R 16/03* (2013.01); *B60W 30/08* (2013.01); *G06F 9/4893* (2013.01)

(58) Field of Classification Search
CPC .... B60R 16/0231; B60R 16/03; B60W 30/08; B60W 50/0097; B60W 50/14; B60W 60/00186; G01R 19/0053; G06F 9/4893
See application file for complete search history.

(56) References Cited

U.S. PATENT DOCUMENTS

| 10,937,310 | B2  |   | 3/2021  | Mueck et al. |
|---|---|---|---|---|
| 2005/0268708 | A1 | * | 12/2005 | Satou ..................... B60T 8/172  73/146 |
| 2013/0289799 | A1 | * | 10/2013 | Johnson .............. B60W 30/146  701/99 |
| 2018/0029606 | A1 | * | 2/2018  | Ohmae .................. G05B 17/02 |
| 2019/0258812 | A1 |   | 8/2019  | Wolf et al. |
| 2019/0324422 | A1 |   | 10/2019 | Capodanno et al. |
| 2020/0017117 | A1 | * | 1/2020  | Milton ................. G08G 1/0112 |

(Continued)

FOREIGN PATENT DOCUMENTS

DE   102012215343 A1    5/2014
EP       3702971 A1 *  9/2020

*Primary Examiner* — Peter D Nolan
*Assistant Examiner* — Ce Li Li
(74) *Attorney, Agent, or Firm* — Brooks, Cameron & Huebsch, PLLC

(57) ABSTRACT

A vehicle-based apparatus for noise injection and monitoring includes a first processing device coupled to a plurality of components and a second processing device coupled to the plurality of components. The second processing device injects noise into at least one component among the plurality of components and monitors behavior of the at least one component in response to the injected noise. The second processing device determines, based, at least in part, on the monitored behavior of the at least one component responsive to the injected noise, a susceptibility to the injected noise exhibited by the at least one component and transmits signaling indicative of the determined susceptibility to the injected noise exhibited by the at least one component to the first processing device.

20 Claims, 7 Drawing Sheets

(56) References Cited

U.S. PATENT DOCUMENTS

2022/0118991 A1* 4/2022 Chen .................. B60W 50/038
2022/0363277 A1* 11/2022 Deckmyn ............... G06F 3/061
2023/0059379 A1* 2/2023 Hiraga .................. G06F 30/20

* cited by examiner

```
                                750
```

┌─────────────────────────────────────────────────────────────────────┐
│ RECEIVING, BY A PROCESSING DEVICE RESIDENT ON AN ELECTRONIC         │
│ CONTROL UNIT (ECU) OF A VEHICLE, FIRST SIGNALING THAT INCLUDES A    │─ 751
│ CONTROLLED AMOUNT OF NOISE AS PART OF PERFORMING A FUNCTIONAL       │
│ SAFETY OPERATION INVOLVING THE VEHICLE                              │
└─────────────────────────────────────────────────────────────────────┘
                                  │
┌─────────────────────────────────────────────────────────────────────┐
│ PROCESSING THE FIRST SIGNALING THAT INCLUDES THE CONTROLLED         │
│ AMOUNT OF NOISE TO GENERATE SECOND SIGNALING THAT INCLUDES          │─ 752
│ THE CONTROLLED AMOUNT OF NOISE                                      │
└─────────────────────────────────────────────────────────────────────┘
                                  │
┌─────────────────────────────────────────────────────────────────────┐
│ APPLYING THE SECOND SIGNALING THAT INCLUDES THE CONTROLLED          │
│ AMOUNT OF NOISE TO A PLURALITY OF VEHICLE COMPONENTS COUPLED        │─ 753
│ TO THE ECU                                                          │
└─────────────────────────────────────────────────────────────────────┘
                                  │
┌─────────────────────────────────────────────────────────────────────┐
│ MONITORING BEHAVIOR OF THE PLURALITY OF VEHICLE COMPONENTS IN       │
│ RESPONSE TO THE APPLIED SECOND SIGNALING THAT INCLUDES THE          │─ 754
│ CONTROLLED AMOUNT OF NOISE                                          │
└─────────────────────────────────────────────────────────────────────┘
                                  │
┌─────────────────────────────────────────────────────────────────────┐
│ DETERMINING, IN RESPONSE TO THE APPLIED SECOND SIGNALING THAT       │
│ INCLUDES THE CONTROLLED AMOUNT OF NOISE, WHETHER THE BEHAVIOR       │
│ OF THE PLURALITY OF VEHICLE COMPONENTS IS INDICATIVE OF A           │─ 755
│ SUSCEPTIBILITY TO THE CONTROLLED AMOUNT OF APPLIED NOISE THAT       │
│ MEETS OR EXCEEDS A THRESHOLD NOISE SUSCEPTIBILITY PARAMETER         │
└─────────────────────────────────────────────────────────────────────┘
                                  │
┌─────────────────────────────────────────────────────────────────────┐
│ TRANSMITTING, TO A DIFFERENT PROCESSING DEVICE RESIDENT ON THE      │
│ ECU, THIRD SIGNALING INDICATING THAT THE BEHAVIOR OF THE            │
│ PLURALITY OF VEHICLE COMPONENTS IS INDICATIVE OF THE                │
│ SUSCEPTIBILITY TO THE CONTROLLED AMOUNT OF APPLIED NOISE THAT       │─ 756
│ MEETS OR EXCEEDS THE THRESHOLD NOISE SUSCEPTIBILITY PARAMETER       │
│ WHEN THE SUSCEPTIBILITY TO THE CONTROLLED AMOUNT OF APPLIED         │
│ NOISE MEETS OR EXCEEDS THE THRESHOLD NOISE SUSCEPTIBILITY           │
│ PARAMETER                                                           │
└─────────────────────────────────────────────────────────────────────┘

*FIG. 7*

VEHICLE-BASED APPARATUS FOR NOISE INJECTION AND MONITORING

TECHNICAL FIELD

Embodiments of the disclosure relate generally to systems for monitoring vehicle-based functional safety risks, and more specifically, relate to a vehicle-based apparatus for noise injection and monitoring.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices. A vehicle can include a number of memory sub-systems.

BRIEF DESCRIPTION OF THE DRAWINGS

The present disclosure will be understood more fully from the detailed description given below and from the accompanying drawings of various embodiments of the disclosure.

FIG. 7 illustrates an example process for a vehicle-based apparatus for noise injection and monitoring in accordance with one or more embodiments of the present disclosure.

DETAILED DESCRIPTION

Figure 1:
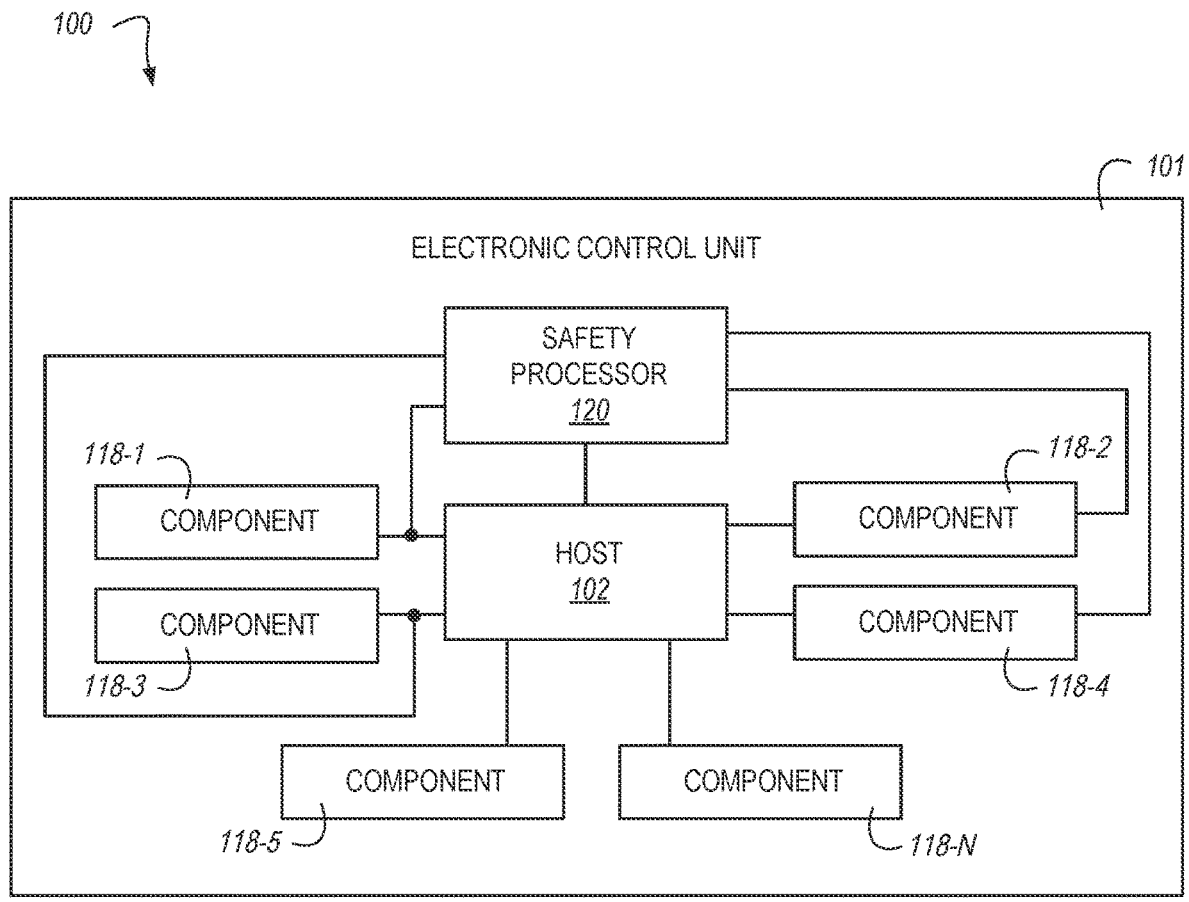
FIG. 1 illustrates an example computing system that includes an electronic control unit in accordance with some embodiments of the present disclosure.

Aspects of the present disclosure are directed to monitoring, detecting, and/or abating functional safety risks in components of a vehicle and, in particular, to monitoring, detecting, and/or abating such risks in components of an electronic control unit of a vehicle. For example, a vehicle may include one or more electronic control units that can include various components that perform various tasks during operation of the vehicle. These components can be controlled by one or more control units. A vehicle component can include a vehicle sub-system that may be, for example, an airbag sub-system, a braking sub-system, a steering sub-system, an infotainment sub-system, a sensor sub-system, and/or a camera sub-system, among others. The electronic control unit(s) can include processors and/or memory devices that include one or more functional safety detection elements.

As used herein, the term "functional safety" and, given the context, variants thereof, generally refers to monitoring and/or mitigation of potential failures that can involve the components of an electronic control unit of a vehicle (e.g., portions of a vehicle sub-system and/or components of a computing system containing one or more sub-systems and/or components of an electronic control unit of a vehicle) that rely upon automatic and/or automated protection mechanisms (e.g., mechanisms that are generally implemented in the absence of human input) to ensure that such sub-systems and/or components (or portions thereof) of the electronic control unit can operate in response to a failure condition. Accordingly, paradigms that employ functional safety mechanisms can be designed to process, handle, and/or abate failure conditions that can be introduced to the electronic control unit of a vehicle, such as human errors, hardware failures, software failures, and/or operational stress experienced by the electronic control unit, among others.

In scenarios in which the electronic control unit, and hence the components described herein, are resident on a vehicle (e.g., an autonomous vehicle), the components and/or vehicle sub-systems can include, for example, an airbag sub-system for monitoring the need to deploy airbags, a rearview camera sub-system, an engine management system for controlling acceleration, an electric power steering sub-system, and/or an object detection sub-system, among others. As used herein, the term "resident on" refers to something that is physically located on a particular collection of hardware. For example, a vehicle component and/or a vehicle sub-system being resident on the electronic control unit refers to a condition in which the vehicle component and/or the vehicle sub-system is physically coupled to, or physically within the electronic control unit. The term "resident on" may be used interchangeably with other terms such as "deployed on," "located on," or "housed," herein.

Further, as used herein, the term "vehicle," and variants thereof, generally refers to an autonomous vehicle that includes an electronic control unit that includes the sub-systems and components described herein. An "autonomous vehicle" generally refers to a vehicle such as a car, truck, bus, motorcycle, moped, all-terrain vehicle, military vehicle, tank, etc. in which at least a portion of the decision-making and/or control over vehicle operations is controlled by computer hardware and/or software, as opposed to a human operator.

As autonomous vehicles become increasingly prevalent, concerns regarding the safety of these vehicles must be addressed. For example, because the safety of the driver and passengers, as well as the long-term health and efficiency of the vehicle can rely on the accuracy of the functional safety components associated therewith, high standards of functionality and reliability for the vehicle sub-systems and/or vehicle components controlled by an electronic control unit associated with the vehicle can be desirable in order to ensure safe operation of the vehicle. That is, the overall Automotive Safety and Integrity Level (ASIL) can be negatively impacted by failures of individual vehicle components and/or vehicle sub-systems of an electronic control unit, thereby giving rise to a need for methods, systems, and apparatuses for continuously monitoring vehicle components and/or vehicle sub-systems of the electronic control unit(s) described herein.

In some approaches, when components and/or sub-systems of an electronic control unit are monitored, a predicted failure in time (FIT) rate for the monitored components and/or sub-systems can be calculated. In general, if the FIT rate exceeds a certain threshold level, a host system can attempt to respond to a predicted failure. For example, the host system may notify a user (e.g., a driver or owner of the vehicle) of the predicted failure, thereby providing them with information needed to schedule service for a component and/or sub-system that may experience the predicted failure. Alternatively, the host system may make certain adjustments to prevent failure of the component(s) and/or sub-system(s) by attempting to rely on data from a different component and/or sub-system of an electronic control unit to attempt to mitigate the predicted failure.

In such approaches, monitoring of the vehicle components (e.g., of functional safety components) and/or vehicle sub-systems is generally conducted by a host processing device of the host system. Because the host processing device is generally provisioned with ample computing resources, such approaches seek to leverage the computing capabilities of the host processing device to monitor the components described herein. However, the host processing device is also generally responsible for performing a wide array of other operations to control not only the electronic control unit, but also the entire computing system in which the host processing device is deployed. Therefore, the host processing device may not always have sufficient computing resources available to process, for example, highly time sensitive operations such as operations that involve processing of functional safety data. As such, a microcontroller(s) may be assigned to monitor one or more vehicle components and can communicate with the host processor when a failure is predicted. This places a significant burden on the microcontrollers since the entire system relies on them to accurately detect errors and predict failures in the components and communicate risks to the host processor. Accordingly, there is a need for improved systems, methods, and apparatuses for monitoring safety risks.

In order to address these and other concerns, embodiments of the present disclosure allow for continuous monitoring and/or active management of vehicle components and/or vehicle sub-systems of an electronic control unit through the use of one or more specialized microcontrollers, which may be referred to herein as "safety processor(s)" and or "safety processing device(s)." In some embodiments, a single such microcontroller can be provided to monitor and/or control operations for multiple components while in other embodiments, multiple microcontrollers can be provided in a 1:1 relation to the components monitored by the microcontrollers. For example, in some embodiments, each vehicle component and/or vehicle sub-system can be monitored and/or actively managed (e.g., by execution of control operations involving the vehicle component and/or vehicle sub-system) by a corresponding microcontroller, while in other embodiments the microcontroller(s) can monitor more than one or all vehicle components and/or vehicle sub-systems.

For example, in at least one embodiment of the present disclosure, an apparatus may include a host processor coupled to a number of components (e.g., vehicle components and/or vehicle sub-systems that can include memory devices) and a second processor (e.g., a "safety" processor) coupled to the components. The safety processor may also be coupled to each vehicle component and/or vehicle sub-system and may monitor characteristics of each component and/or vehicle sub-system. Based on the monitored characteristic(s), the safety processor may determine a threat level for a particular vehicle component and/or vehicle sub-system. For example, the monitored characteristics(s) can include a threat level that can be indicative of a failure-in-time rate for the particular vehicle component and/or vehicle sub-system. The safety processor may determine whether the threat level meets or exceeds a certain threshold threat level. If the threshold threat level is met or exceeded, the safety processor may transmit signaling indicative of the determination that the threat level meets or exceeds the threshold threat level for the particular vehicle component and/or vehicle sub-system to the host processing device and/or remediate operations executed by the particular vehicle component and/or vehicle sub-system in response the determination that the threat level meets or exceeds the threshold threat level for the particular vehicle component and/or vehicle sub-system.

Using a single processor to monitor the safety of each component of the system and communicate threat levels with the host processor presents many advantages over relying on multiple processors or multiple microcontrollers. For example, embodiments of the present disclosure promote ease of installation and maintenance. Additionally, embodiments of the present disclosure may lessen spatial constraints while more reliably monitoring the safety levels of components.

Further, embodiments of the present disclosure allow for the injection of various types of noise into the components to effectively create controlled stress conditions on the components described herein. As described in more detail below, the noise can be radio frequency noise, power supply noise, and/or noise characterized by random signal fluctuations, among other types of noise. By injecting these types of noise into the components and monitoring the behavior of the components in response to the injected noise, it is possible to identify particular components that are sensitive to various types of noise.

Once components that are sensitive to the injected noise are identified, an action can be taken to mitigate potential functional safety risks associated with the identified components. For example, workloads assigned to components that are identified as being sensitive to various types of noise can be reduced and/or allocated to more robust components. Embodiments are not so limited, however, and in some embodiments, these components can be retired and/or marked for replacement or repair. By injecting and monitoring noise to the components, as described herein, it may be possible to identify components that may be likely to present a functional safety risk and proactively perform actions that mitigate the actual occurrence of a functional safety risk involving such components. This can, especially in the context of autonomous vehicle components, improve the safety of the autonomous vehicle.

As used herein, the term "electronic control unit" generally refers to an embedded electronic system or apparatus. For example, an electronic control unit (ECU) in accordance with the present disclosure may be an embedded system in a vehicle that is responsible for controlling a specific function of the vehicle. An ECU may control one or more vehicle components and/or vehicle sub-systems of a vehicle and may include hardware circuitry such as, but not limited to, microcontrollers, memory devices, input components, output components, or communication links (e.g., bus transceivers). An ECU may also be referred to as an "electronic control module." Examples of ECUs in accordance with the present disclosure include, but are not limited to, infotainment control modules (ICMs), engine control modules (ECMs), powertrain control modules (PCMs), transmission control modules (TCMs), brake control modules (BCMs or EBCMs), central control modules (CCMs), central timing modules (CTMs), general electronic modules (GEMs), body control modules (BCMs), suspension control modules (SCMs), control units, control modules, or any combination thereof. ECUs may have embedded software and/or firmware.

In some embodiments, an ECU may receive inputs from parts of the vehicle depending on the ECU's intended function. For example, an ECU responsible for brake control, such as a BCM, may receive inputs from sensors or other devices that detect objects, speed limit changes, or traffic signs or signals in the vehicle's path. The ECU may also be communicably coupled to systems or components of the vehicle that can perform an action based on the inputs. For example, a BCM may control a brake or a brake actuator. When the BCM receives inputs indicating a need for deceleration, the BCM can cause brake activation.

As used herein, the term "host processing device" may be used interchangeably with the term "central processing unit (CPU)" and "host processor." A host processing device may be housed on/within an ECU and may be considered the host processing device for the system or sub-system which the ECU controls. In general, a host processing device includes a complex instruction set computer architecture (CISC), such as an x86 architecture or other suitable CISC architecture, while the safety processor(s) described herein can generally include a reduced instruction set computer (RISC) architecture.

As used herein, the term "threat level" generally refers to a condition that describes a likelihood of a malfunction or poor performance experienced by a vehicle component and/or a vehicle sub-system during operation. For example, human errors, hardware failures, software failures, and/or operational stress experienced by various vehicle components and/or vehicle sub-systems can lead to increasing chances that a failure of one or more of the vehicle components and/or vehicle sub-systems will occur. A "threat level" can therefore refer to the likelihood that such malfunctions and/or degradation of performance involving by a vehicle component and/or a vehicle sub-system will occur within a certain amount of time and/or operational cycles. A threat level may be the inverse of a safety level for a particular component.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure. In addition, as will be appreciated, the proportion and the relative scale of the elements provided in the figures are intended to illustrate certain embodiments of the present invention and should not be taken in a limiting sense.

As used herein, the singular forms "a," "an," and "the" can include both singular and plural referents, unless the context clearly dictates otherwise. In addition, "a number of," "at least one," and "one or more" (e.g., a number of components) can refer to one or more components, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. Analogous elements within a Figure may be referenced with a hyphen and extra numeral or letter. Such analogous elements may be generally referenced without the hyphen and extra numeral or letter. For example, elements 118-1, 118-2, . . . and 118-N or, in the alternative, 118-1 to 118-N, for example in FIG. 1 may be collectively referenced as 118. As used herein, the designators "N," etc. particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure.

FIG. 1 illustrates an example system 100 that includes an electronic control unit (ECU) 101. The ECU may be, for example, an ECU of a vehicle. A host processing device 102 may be resident on the ECU 101 and coupled to one or more components 118-1, . . . , 118-N (herein after referred to collectively as 118) in accordance with embodiments of the present disclosure. In some embodiments, the system 100 may be resident on an ECU 101 of an autonomous vehicle (e.g., the vehicle 641 illustrated in FIG. 6, herein) and may therefore be referred to in the alternative as "vehicle components." The ECU 101 may be configured to enable features such as GPS, maps, and/or temperature control within the vehicle, and/or storage, viewing, or streaming of visual or audio data within the vehicle. As such, the host processing device 102 and/or the ECU 101 may be part of an infotainment system of a vehicle.

As shown in FIG. 1, the components 118 may be resident on the ECU 101. Although shown as being resident on the ECU 101, the components 118 may be located in other portions of the system 100 that do not include the ECU 101. The components 118 can include hardware circuitry that can control aspects of operation of the vehicle (e.g., driving operations, such as steering and/or braking, infotainment operations, such as map display, audio-visual media reproduction, etc.). The hardware circuitry of the components 118 can include computing resources such as processing devices and/or include memory devices, which are described in connection with FIG. 4, herein. For example, the components 118 can include combinations of volatile and/or non-volatile memory devices. In some embodiments, at least some of the components 118 may be active vehicle safety components, passive vehicle safety components, infotainment systems, or any combination thereof. Non-limiting examples of passive vehicle safety components include vehicle components and/or vehicle sub-systems that are designed to minimize or prevent the risk of injury in an accident and are only activated when an accident or risk of an accident is detected. Such vehicle components and/or vehicle sub-systems may include, for example: airbag sub-systems, brake sub-systems, and/or active head restraint sub-systems.

Non-limiting examples of active vehicle safety components include vehicle components and/or vehicle sub-systems that continuously operate to prevent accidents or risks associated with operation of the vehicle. Such vehicle components and/or vehicle sub-systems may include, for example, traction control sub-systems, electronic stability control sub-systems, drive assist sub-systems, or brake sub-systems.

Non-limiting examples of infotainment systems include vehicle components and/or vehicle sub-systems that are designed to provide occupants of the vehicle with audio-visual information and/or to provide audio-visual entertainment to passengers of the vehicle. Vehicle infotainment systems may be any combinations of circuitry within the vehicle that can transmit entertainment and/or information to the driver or passengers of the vehicle through, for example, displays, speakers, buttons, voice commands, or visual or audio interfaces. Infotainment systems include hardware components that can execute computer-readable instructions to transmit information to the driver or passengers of the vehicle.

The host processing device 102 may be coupled to processing resources, memory resources, and network resources. As used herein, "resources" generally refer to physical and/or virtual computing devices that have a finite availability within a computing system 100. The host processing device 102 can include one or more processor chipsets, which can execute a software stack. The host processing device 102 can include one or more cores, one or more caches, a memory controller (e.g., NVDIMM controller), and a storage protocol controller (e.g., PCIe controller, SATA controller, etc.). The host processing device 102 may, for example, generate signals and/or commands that can include memory access requests to cause data to be written to the memory components 118 and/or cause data to be read from the memory components 118. The host processing device 102 may be part of a host processing system that may be configured to provide virtualized or non-virtualized access to other components of the system 100, such as the memory components 118. Virtualization can include abstraction, pooling, and automation of the processing memory, and/or network resources.

Although not shown in FIG. 1, a physical host interface can be used to transmit data between the host processing device 102 and the memory components 118. The host processing device 102 can be coupled to the memory components 118 via a physical host interface. Examples of a physical host interface include, but are not limited to, a serial advanced technology attachment (SATA) interface, a PCIe interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), (ONFI), Double Data Rate (DDR), Low Power Double Data Rate (LPDDR), or any other interface.

As illustrated in FIG. 1, the system 100 can include a safety processor 120, which can be referred to in the alternative as a "safety processing device," coupled to the components 118. Although not explicitly shown in FIG. 1, in some embodiments, the safety processing device 120 and/or the host processing device 102 may be resident on a shared system-on-a-chip (SoC). A portion of or all of the components 118 may also be resident on that SoC, or a portion of or all of the components 118 may be external to the SoC.

FIG. 1 shows the safety processing device 120 being resident on the ECU 101. However, embodiments of the present disclosure are not so limited. For example, the safety processing device 120 may reside outside of the ECU 101 while still receiving data from and transmitting signals to components 118-N and the host processing device 102. Such an embodiment is described in more detail, for example, in FIG. 5. In some embodiments, the safety processor 120 may be provided as a virtual computing instance (e.g., the functionality of the safety processor 120 can be implemented on a virtual machine that shares a pool of computing resources with the host processing device 102).

The safety processing device 120 may also be coupled to the host system 102 such that the safety processing device 120 may monitor the components 118 and communicate any safety threats associated with the components 118 to the host processing device 102. For example, the safety processing device 120 may continuously monitor each of the components 118. One or more characteristics may be monitored for a given component 118. These characteristics may include, for example, a predicted failure-in-time rate, a measured temperature of the component 118, a pre-determined acceptable temperature range for the component 118 (wherein the acceptable range is stored in memory), a sensitivity of the component 118 to voltage, a sensitivity of the component 118 to noise, types of data being transmitted by the component 118 to the safety processing device 120, unreadable data received by the safety processing device 120 from the component 118, an operation level of the component 118, or any combination thereof.

One or more of the components 118 may include a memory device (e.g., the memory device 421 illustrated in FIG. 4, herein) such as a DRAM device. The safety processing device 120 may monitor a failure in time rate of the component 118 or calculate a failure in time rate based on other characteristics of component 118 which the safety processing device 120 is monitoring. If the failure in time rate is above a threshold failure in time (FIT) rate, the safety processing device 120 can transmit a signal to the host processing device 102. For example, the FIT rate may be 10 (in other words, 10 predicted failures in a period on the order of 1,000,000,000 operation hours). If the FIT rate is 11 or higher, the safety processing device 120 may transmit a signal to the host processing device 102. The host processing device 102 may then make adjustments and compensations that prevent the entire system 100 from failing in the event that the component 118 fails.

Some of the components 118 (e.g., 118-1, . . . , 118-4) may be coupled directly to the safety processing device 120, while other components (e.g., 118-5 and 118-N) may not be directly coupled to the safety processing device 120. Rather, as shown in FIG. 1, components such as 118-5 and 118-N may be coupled directly to the host processing device 102. Because the safety processing device 120 is also coupled to the host processing device 102, the safety processing device 120 may monitor characteristics of the components 118-5 and 118-N through the host processing device 120.

While monitoring characteristics of the components 118, the safety processing device 120 may determine a threat level of at least one component 118 based on at least one of the characteristics. The safety processing device 120 may also determine whether the threat level meets or exceeds a threshold threat level for the component 118. If the threat level meets or exceeds the threshold threat level for that component 118, the safety processing device 120 may transmit a signal indicative of the determination that the threat level meets or exceeds the threshold threat level to the host processing device 102. The threshold threat level may be based on input, for example, by a manufacturer or a user. This threshold threat level may be stored in memory of the system 100 (e.g., in the memory devices of the component(s) 118) or, if the system 100 is part of a vehicle, in memory elsewhere within the vehicle. For example, the threshold threat level may be stored in a memory sub-system of the vehicle specifically dedicated to storing such values. The threshold threat level may also be stored in a memory that may be read by a processor, such as safety processing device 120 or host processing device 102. For example, if the component 118 includes a memory device, the threshold value for the memory device and/or other memory devices of the system 100 may be stored in the memory device(s) of one or more of the components 118.

In some embodiments, the safety processing device 120 may execute operations to predict a failure in time rate of one or more of the components 118. The predicted failure in time rate may be based on at least one characteristic of the component 118 which the safety processing device 120 monitors. The characteristics can include a predicted failure in time rate, although embodiments are not so limited. For example, in some embodiments, the characteristics can include a quantity of program-erase-cycles experienced by a memory device of the component 118, workloads experienced by the component 118, criticality of operations performed by the component 118, and/or temperatures experienced by the component 118, among others. The safety processing device 120 may compare the characteristic monitored to an operational range for that characteristic and component 118. In some embodiments, the operational range corresponds to a set of parameters or characteristics that are exhibited by a component 118 during operation within which the component 118 functions correctly. If the set of parameters and/or characteristics exhibited by the component 118 fall outside the operational range, the component 118 may not operate correctly or may fail. The safety processing device 120 may determine whether the predicted failure in time rate meets or exceeds a threshold failure in time rate. In response to a determination that the predicted failure in time rate meets or exceeds the threshold failure in time rate, the safety processor 120 can generate a signal indicating the same and can transfer the signal to the host processing device 102.

After receiving the signal, the host processing device 102 may take appropriate actions. For example, the host processing device 102 may cause a message to be transmitted to a user through an interface. Although not shown in FIG. 1, the ECU 101 may be communicably coupled to a user interface of a vehicle. The message may include information such as an identifier of the component 118 with a threat level exceeding the threshold level, a sub-system of that component, and/or the type of characteristic monitored to determine that threat level. For example, if the safety processor 120 detects unreadable data from a memory device 118 of an electronic brake sub-system, the message may contain the identifier for that component, an indication that the component is part of the electronic brake sub-system, and/or an "unreadable data" error indicator. As such, the message may enable the user to promptly correct the issue.

The host processing device 102 may also alter usage of the particular component 118 by the system 100. For example, the host processing device 102 may decrease usage levels of a particular component (e.g., the component 118-1) in favor of a different component 118 (e.g., the component 118-2).

In some embodiments, the safety processing device 120 may perform functions such as monitoring characteristics of the components 118-N, calculating threat levels, predicting failure in time rates, and transmitting signals to the host processing device 102 while the host processing device 102 remains idle (e.g., as part of performance of background operations involving the host processing device 102). The safety processing device 120 may also perform such functions while the host processing device 102 is performing certain operations (e.g., as part of performance of foreground operations involving the host processing device 102).

Although FIG. 1 illustrates only one safety processing device 120, embodiments of the present disclosure are not so limited. For example, in some embodiments, the system 100 may include an additional safety processing device. In such embodiments, the additional safety processing device may continuously monitor one or more characteristics of at least a portion of components 118. The components monitored by the additional safety processing device may be unique from the components 118 monitored by the safety processing device 120. The additional safety processing device(s) may perform functions similar to those performed by the safety processing device 120 (e.g., monitoring characteristics of the components 118 or of a different set of components to determine a threat level and/or to take an action in response to the determined threat level meeting or exceeding a threat level threshold). In some embodiments, the additional safety processing device may be assigned to monitor different characteristics of the same components 118 monitored by the safety processing device 120. For example, in some embodiments, the safety processing device 120 may monitor temperatures of the components 118, while the additional safety processing device may monitor unreadable data received from components 118.

As discussed above, system 100 may be a system within a vehicle. For example, the vehicle may be an autonomous vehicle equipped with functional safety detection operations. A functional safety detection operation may include monitoring, predicting, determining, or altering characteristics of any components of the vehicle in order to detect risks or hazards associated with the vehicle due to malfunctions of electrical or electronic systems or components of the vehicle.

Figure 4:
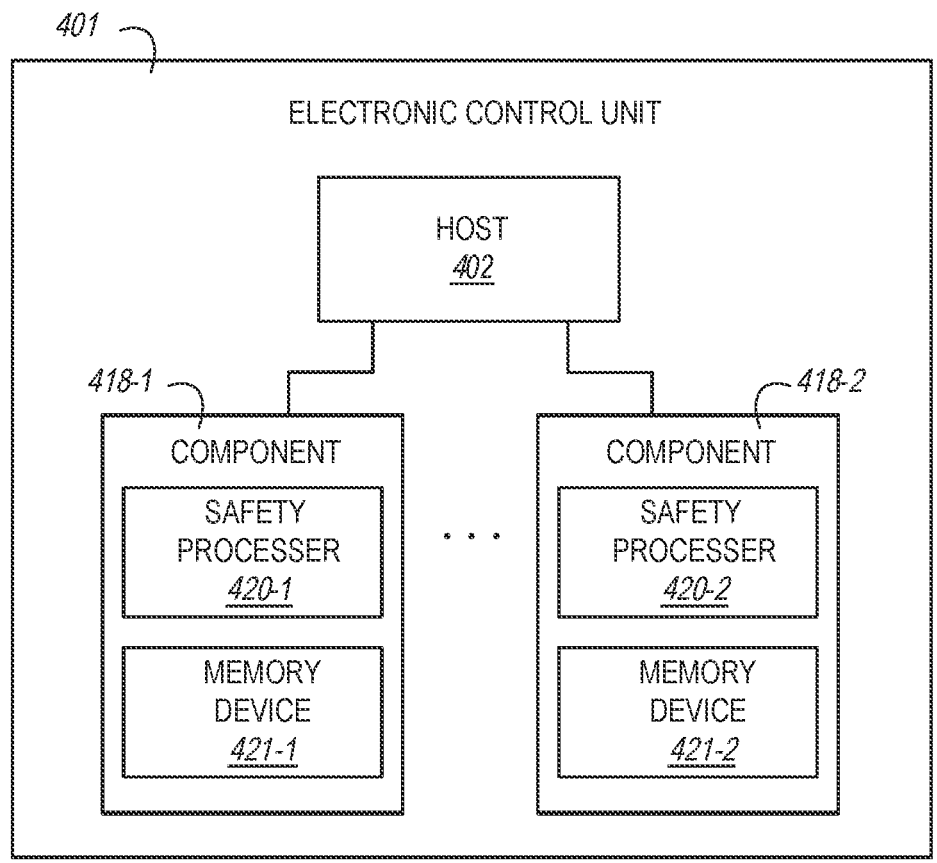
FIG. 4 illustrates an example electronic control unit in accordance with some embodiments of the present disclosure.

In some embodiments, at least one of the components 118-1, . . . , 118-N can include a memory device, as shown in FIG. 4, herein. The memory devices (e.g., the memory devices 421-1, 421-2 illustrated in FIG. 4) can provide storage and/or memory to the components 118-1, . . . , 118-N. For example, the memory devices can store, buffer, or otherwise retain information associated with operation of vehicle sub-systems and/or the components 118 of the ECU 101.

Figure 2:
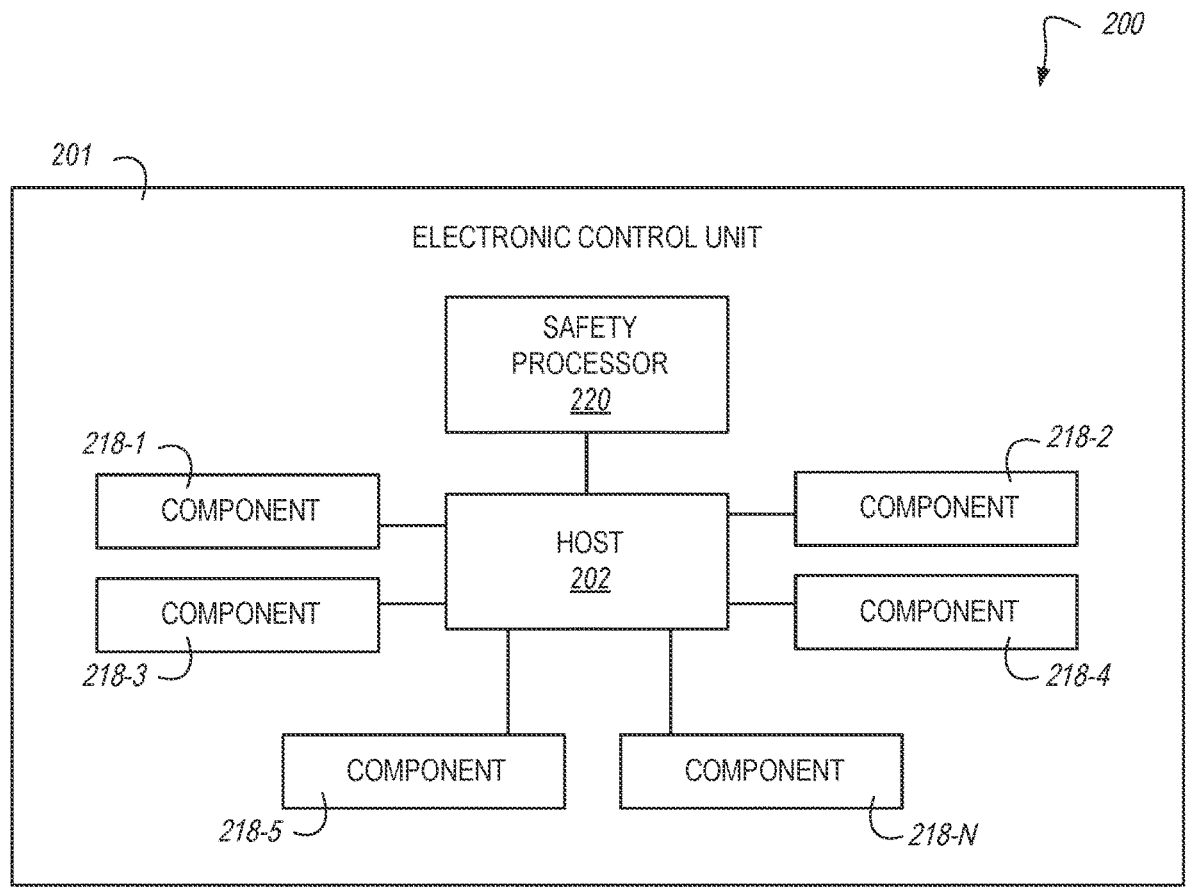
FIG. 2 illustrates another example computing system that includes an electronic control unit in accordance with some embodiments of the present disclosure.

FIG. 2 illustrates another example computing system that includes an electronic control unit in accordance with some embodiments of the present disclosure. Similar to the system 100 illustrated in FIG. 1, the system 200 may include an ECU 201. The ECU 201 may house a host processing device 202, a safety processing device 220, and a number of components 218 coupled to the host processing device 202. The safety processing device 220 may not be coupled directly to any of the components 218. However, because the safety processing device 220 is coupled directly to the host processing device 202 and the host processing device 202 is coupled directly to each of the components 218, the safety processing device 220 may monitor characteristics of the components 218 through the host processing device 202 and report safety threats to the host processing device 202 based on data received from the components 218.

The host processing device 202 may receive data from the components 218 of the system 200 and transmit that data to the safety processing device 220. The safety processing device 220 may then determine, based on the data, a threat level for a particular component 218. The safety processing device 220 may determine whether that threat level meets or exceeds a threshold threat level for that particular component 218.

In some embodiments, the ECU 201 may be part of an autonomous vehicle. The threshold threat level may be based on a desired functional safety level of an autonomous vehicle, such as the vehicle 641 illustrated in FIG. 6, herein. In some instances, the safety processing device 220 or the host processing device 202 may determine (e.g., calculate) the threshold threat level for a particular component 218 based on the desired functional safety level of the autonomous vehicle. In other instances, the threshold threat levels for the components 218 may include information received from a manufacturer or a user.

Responsive to a determination that the threat level meets or exceeds the threshold threat level, the safety processing device 220 may transmit signaling to the host processing device 202. That signaling may be indicative of performance of an operation to mitigate a threat to the component 218. For example, the signaling may include instructions for the host processing device 202 to perform an action, such as altering usage levels of the component 218 or transmitting a message to user indicative of the threat.

Although FIG. 2 shows the safety processing device 220 as being resident on the ECU 201, embodiments of the present disclosure are not so limited. For example, the safety processing device 220 may be removably coupled to the ECU 201 and/or to the host processing device 202.

Figure 3:
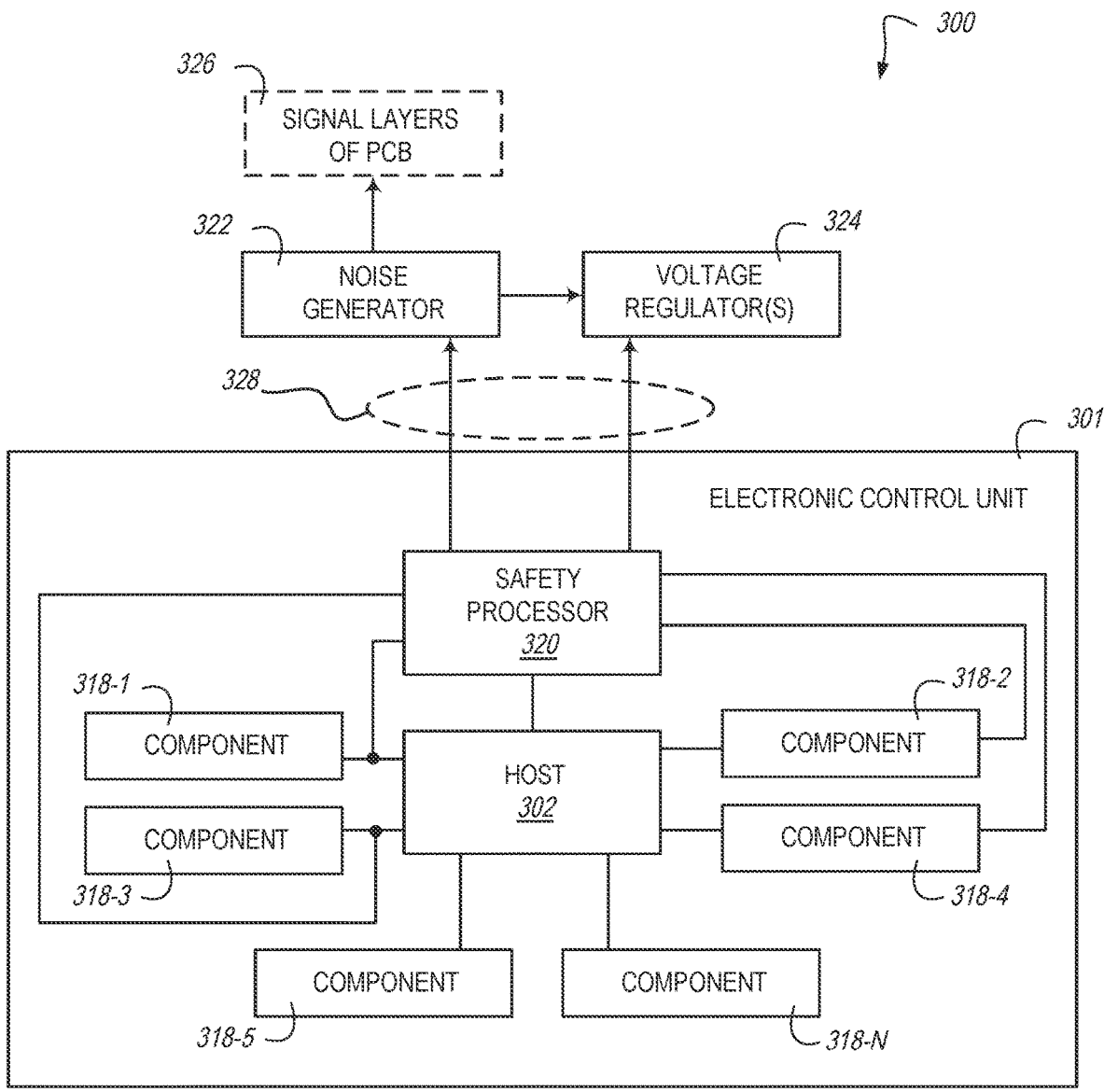
FIG. 3 illustrates yet another example computing system that includes an electronic control unit in accordance with some embodiments of the present disclosure.

FIG. 3 illustrates yet another example computing system 300 that includes an electronic control unit 301 in accordance with some embodiments of the present disclosure. As illustrated in FIG. 3, a system 300 may include an ECU 301, which may have a host processing device 302 and a safety processing device 320 coupled to the host processing device 302 resident thereon. The host processing device 302 may be coupled to a number of components 318-1, . . . , 318-N. The safety processing device 320 may also be coupled to at least one of the components 318 (e.g., components 318-1, 318-2, 318-3, and/or 318-4). As described previously herein, the safety processing device 320 may monitor characteristics of the components 318 either through direct connections or indirectly through the host processing device 302. The system 300, the ECU 301, the host processing device 302, the components 318, and the safety processing device 320 can be analogous to the system 100, 200, the ECU 101, 201, the host processing device 102, 202, the components 118, 218, and the safety processing device 120, 220 illustrated in FIGS. 1-2, herein.

The system 300 may also include a noise generator 322, one or more voltage regulators 324, and/or one or more signal layers 326 of a printed circuit board (PCB). In some embodiments, the safety processing device 320 may be communicably coupled to the voltage regulator(s) 324 and to the noise generator 322. The noise generator 322 may be communicably coupled to the signal layers of the printed circuit board 326.

An interface 328 may be used to transmit data between the ECU 301, the noise generator 322 and/or the voltage regulator(s) 324. The interface 328 may be, for example, a physical host interface. Examples of a physical host interface include, but are not limited to, a serial advanced technology attachment (SATA) interface, a PCIe interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), (ONFI), Double Data Rate (DDR), Low Power Double Data Rate (LPDDR), high-speed interface, or any other interface. Embodiments are not so limited, however, and in some embodiments, the interface 328 can be a virtualized interface (e.g., a virtualized network interface controller) or a wireless interface, such as an interface that is configured to communicate using an IEEE 802 protocol (e.g., Wi-Fi, Bluetooth, etc.).

The noise generator 322 can include hardware circuitry to generate and/or inject radio frequency (RF) noise into the system 300. The RF noise can be generated and/or injected into the system 300 by the noise generator 322 to identify which, if any of the components 318 are sensitive to RF noise. For example, certain components 318 of the system 300 can exhibit less than ideal behavior and/or performance in the presence of RF noise. In order to determine if there are components 318 of the system 300 that exhibit less than ideal behavior and/or performance when subjected to RF noise, the noise generator 322 can generate and inject known and/or controlled RF noise signals in the system 300 and the safety processing device 320 can monitor the behavior of the components 318 to determine which, if any of the components 318 are sensitive to the injected RF noise. In some embodiments, the noise generator 322 can generate controlled RF noise signals (e.g., RF noise signals having a predetermined magnitude) and transmit such signals to the safety processor 320. The safety processor 320 can receive and/or process the controlled RF noise signals, inject the signals into the system 300 such that the signals are injected into at least one of the components 318, monitor behavior of the at least one component in response to the injected noise, and/or determine a susceptibility (e.g., a sensitivity) to the injected noise exhibited by the at least one component. In response to a determination that one or more of the components 318 are sensitive to the injected RF noise, the safety processing unit 320 can take an action to abate the degraded behavior and/or performance of such components 318 and/or the safety processing device 320 can apply signaling on the host processing device 302 indicating that particular components 318 have experienced degraded behavior and/or performance as a result of the introduction of the RF noise. For example, in some embodiments, the safety processor 320 can transmit signaling indicative of the determined susceptibility to the injected noise exhibited by the at least one component to the host processing device 302. The host processing device 302 can further process this signaling and determine whether or not to take an action involving the at least one component to mitigate safety risks associated with the at least one component.

The voltage regulator(s) 324 can include hardware circuitry to vary one or more voltages (e.g., the supply voltage) of the system 300 to introduce voltage stress to the system 300. For example, the voltage regulator(s) 324 can vary the supply voltage of the system 300 and/or the components 318 as part of an operation to determine which, if any of the components 318 are sensitive to voltage fluctuations. For example, certain components 318 of the system 300 can exhibit less than ideal behavior and/or performance in the presence of voltage fluctuations. In order to determine if there are components 318 of the system 300 that exhibit less than ideal behavior and/or performance when subjected to voltage fluctuations, the voltage regulator(s) 324 can generate and inject known and/or controlled voltage fluctuations in the system 300 and the safety processing device 320 can monitor the behavior of the components 318 to determine which, if any of the components 318 are sensitive to the voltage fluctuations.

In some embodiments, the voltage regulator(s) 324 can generate controlled fluctuating voltage signals (e.g., voltage signals having a predetermined magnitude that is outside an ideal voltage range) and transmit such signals to the safety processor 320. The safety processor 320 can receive and/or process the controlled fluctuating voltage signals, inject the signals into the system 300 such that the signals are injected into at least one of the components 318, monitor behavior of the at least one component in response to the injected fluctuating voltage signals, and/or determine a susceptibility (e.g., a sensitivity) to the injected fluctuating voltage signals exhibited by the at least one component. In response to a determination that one or more of the components 318 are sensitive to the voltage fluctuations, the safety processing unit 320 can take an action to abate the degraded behavior and/or performance of such components 318 and/or the safety processing device 320 can apply signaling on the host processing device 302 indicating that particular components 318 have experienced degraded behavior and/or performance as a result of the introduction of the voltage fluctuations. For example, in some embodiments, the safety processor 320 can transmit signaling indicative of the determined susceptibility to the injected voltage fluctuation signals exhibited by the at least one component to the host processing device 302.

Embodiments are not so limited, however, and in some embodiments, the voltage regulator(s) 324 can include hardware circuitry to generate and/or inject power supply noise to the system 300. For example, the voltage regulator(s) 324 can vary the supply voltage of the system 300 and/or the components 318 as part of an operation to determine which, if any of the components 318 are sensitive to voltage fluctuations. For example, certain components 318 of the system 300 can exhibit less than ideal behavior and/or performance in the presence of power supply noise. In order to determine if there are components 318 of the system 300 that exhibit less than ideal behavior and/or performance when subjected to power supply noise, the voltage regulator(s) 324 can generate and inject known and/or controlled power supply noise in the system 300 and the safety processing device 320 can monitor the behavior of the components 318 to determine which, if any of the components 318 are sensitive to the introduced power supply noise.

In some embodiments, the voltage regulator(s) 324 can generate controlled power supply noise signals (e.g., power supply voltage noise signals having a predetermined magnitude) and transmit such signals to the safety processor 320. The safety processor 320 can receive and/or process the controlled power supply noise signals, inject the signals into the system 300 such that the signals are injected into at least one of the components 318, monitor behavior of the at least one component in response to the injected power supply noise signals, and/or determine a susceptibility (e.g., a sensitivity) to the injected power supply noise signals exhibited by the at least one component. In response to a determination that one or more of the components 318 are sensitive to the power supply noise, the safety processing unit 320 can take an action to abate the degraded behavior and/or performance of such components 318 and/or the safety processing device 320 can apply signaling on the host processing device 302 indicating that particular components 318 have experienced degraded behavior and/or performance as a result of the introduction of the power supply noise. For example, in some embodiments, the safety processor 320 can transmit signaling indicative of the determined susceptibility to the injected power supply noise exhibited by the at least one component to the host processing device 302.

As a result of operating the system 300 (and/or as a result of introducing RF noise, power supply noise, and/or voltage fluctuations), the components 318 can experience varying thermal behavior. For example, as the system 300 operates, the components 318 may heat up (or cool down) in response to workloads experienced by the components 318, physical locations of the components 318 with respect to the ECU 301, and/or introduction of RF noise, power supply noise, and/or voltage fluctuations introduced by the noise generator 322 and/or the voltage regulator(s) 324 and/or the safety processor 320 in response to signals received from the noise generator 322 and/or voltage regulator(s) 324. In some instances, varying thermal behavior experienced by the components 318 can lead to degraded behavior and/or performance of the components 318. Accordingly, in some embodiments, the safety processing device 320 can monitor thermal characteristics (e.g., temperatures) of the components 318 over time and under different operating conditions to determine whether varying thermal behavior experienced by the components 318 will lead to degraded behavior and/or performance of the components 318. In response to a determination that one or more of the components 318 are sensitive to the varying thermal behaviors associated therewith and under the current operating conditions of the components 318, the safety processing unit 320 can take an action to abate the degraded behavior and/or performance of such components 318 and/or the safety processing device 320 can apply signaling on the host processing device 302 indicating that particular components 318 have experienced or will experience degraded behavior and/or performance as a result of varying thermal behaviors of the components 318.

That is, in some embodiments, the safety processor 320 can monitor temperature characteristics of the components 318, determine that at least one of the components 318 is operating outside a particular temperature range, and/or transmit signaling indicative of the determination that at least one of the components 318 is operating outside the particular temperature range to the host processing device 320. In such embodiments, the host processing device 320 can alter a workload associated with at least one of the components 318 responsive to receipt of the signaling indicative of the determination that at least one of the components 318 is operating outside the particular temperature range.

The particular temperature range includes a temperature range in which the behavior of the components 318 can, in the absence of degradation of the components 318 and/or in the absence of failures involving the components 318, be generally designed to operate. However, due to imperfections in process variation, workload variance, operational stress, and/or relative physical positioning of the components 318 with respect to other circuitry of the system 300, among other factors, such as functional safety standards, the components 318 can be subjected to temperatures outside of the particular temperature range. This can lead to scenarios in which one or more of the components can exhibit behavior that can present safety risks, especially when the components 318 are deployed in an autonomous vehicle (e.g., the vehicle 641 of FIG. 6).

The signal layers of the PCB 326 generally refer to conductive layers of a PCB. For example, the signal layers of the PCB 326 can include copper layers of the PCB that are interleaved between generally non-conductive layers of the PCB, such as solder mask layers, paste layers, legend layers, etc. Accordingly, in some embodiments, the signal layers of the PCB 326 can be configured to pass signals between the noise generator 322, the voltage regulator(s) 324, and/or the system 300.

In a non-limiting example, an apparatus (e.g., the system 300) can include a first processing device (e.g., the host processor 302) coupled to a plurality of components and a second processing device (e.g., the safety processor 320) coupled to the plurality of components 318. The first processing device, the second processing device, and the plurality of components can be resident on an electronic control unit (ECU) 301 of a vehicle (e.g., the vehicle 641 illustrated in FIG. 6, herein). In some embodiments, the ECU 301 can be communicably coupled to a user interface (e.g., an infotainment control panel, etc.) of the vehicle. As described herein, components among the plurality of components 318 can include active vehicle safety components, passive vehicle safety components, and/or infotainment components.

The second processing device can inject noise into at least one component (e.g., the component 318-1) among the plurality of components 318 and monitor behavior of the at least one component in response to the injected noise. The second processing device can determine, based, at least in part, on the monitored behavior of the at least one component responsive to the injected noise, a susceptibility to the injected noise exhibited by the at least one component and transmit signaling indicative of the determined susceptibility to the injected noise exhibited by the at least one component to the first processing device.

The susceptibility to the injected noise can be a measure of an amount of degraded performance experienced by the component that receives the injected noise. For example, components 318 that are operating as intended can generally withstand a threshold amount of noise (e.g., signal quality variation, power supply fluctuation, external radio frequency noise, etc.) without exhibiting degraded performance. However, components 318 that may not be operating as intended and/or components 318 that may begin to exhibit degraded performance may exhibit detectable degraded performance as a result of noise being injected to such components 318. Components 318 that exhibit detectable degraded performance can be determined to be susceptible the injected noise. Further, the susceptibility of a component to the injected noise can vary such that some components may be less susceptible (e.g., exhibit detectable degraded performance) than other components 318. Accordingly, the susceptibility to the injected noise exhibited by the components 318 can constitute a range in which some components 318 can be determined to be more or less susceptible to the injected noise than other components 318.

Continuing with this example, the second processing device can determine whether the susceptibility to the injected noise exhibited by the at least one component meets or exceeds a threshold noise susceptibility parameter and transmit the signaling indicative of the determined susceptibility to the injected noise exhibited by the at least one component to the first processing device in response to a determination that the susceptibility to the injected noise exhibited by the at least one component meets or exceeds the threshold noise susceptibility parameter.

As used herein, a "threshold noise susceptibility parameter" generally refers to a particular level of susceptibility to the injected noise exhibited by one or more of the components 318 at which the detectable degraded performance of the components 318 may lead to an increased likelihood of the occurrence of a functional safety risk. For example, the "threshold noise susceptibility parameter" can include a level of susceptibility to the injected noise that is indicative of a degraded performance of one or more of the components 318 that could be predictive of an impending failure of the component exhibiting a level of susceptibility to the injected noise that meets or exceeds the threshold noise susceptibility parameter.

In some embodiments, the noise is generated by the noise generator 322, which is coupled to the second processing device. In such embodiments, the noise can comprise radio frequency noise (e.g., noise having a wavelength in a radio frequency spectrum). Embodiments are not so limited, however, and in some embodiments, the noise can be generated by the voltage regulator(s), which are coupled to the second processing device. In these embodiments, the noise can comprise one or more voltage fluctuations associated with a power supply voltage provided to the apparatus.

Continuing with this example, in some embodiments, the second processing device can inject the noise into the at least one component, monitor the behavior of the at least one component in response to the injected noise, determine the susceptibility to the injected noise exhibited by the at least one component, and/or transmit the signaling indicative of the determined susceptibility to the injected noise exhibited by the at least one component to the first processing device as part of performance of a functional safety operation associated with a vehicle.

In another non-limiting example, the system 300 is an electronic control unit (ECU) 301 that includes a first processing device (e.g., the host processor 302) and a second processing device (e.g., the safety processor 320) and multiple vehicle components (e.g., the components 318) coupled to at least the second processing device. As described herein, the vehicle components can include active vehicle safety components, passive vehicle safety components, and/or infotainment components, among other components of a vehicle. Continuing with this example, the system 300 further includes at least one of a noise generator 322 and/or a voltage regulator 324 that are coupled to at least the second processing device.

The second processing device can receive a signal that includes a predetermined amount of noise from the noise generator 322 and/or the voltage regulator 324 and inject noise corresponding to the received signal to at least one of the vehicle components. The second processing device can then monitor behavior of at least one of the vehicle components in response to the injected noise, determine, based, at least in part, on the monitored behavior of the at least one vehicle component responsive to the injected noise, a susceptibility to the injected noise exhibited by at least one of the vehicle components, and transmit signaling indicative of the determined susceptibility to the injected noise exhibited by the at least one vehicle component to the first processing device. The "behavior" of the vehicle components in response to the injected noise generally refers to whether or not the vehicle component experiences degraded performance in response to the injected noise and to what extent the performance of the vehicle components is impacted in response to the injected noise. In some embodiments, the behavior of the vehicle components can be proportional to the susceptibility of the vehicle components to the injected noise.

As described herein, when the signal is received from the noise generator 322, the signal can include a predetermined amount of radio frequency noise. As used herein, the term "predetermined" generally refers to something that is controlled or otherwise known to have a particular value prior to generation of the same. For example, the predetermined amount of radio frequency noise received from the noise generator 322 indicates that the noise generator 322 generated an amount of noise that controlled or otherwise known to have a particular value prior to the signal being received by the first processing device. Further, as described herein, when the signal is received from the voltage regulator(s) 324, the signal can include a predetermined voltage fluctuation involving a power supply of the ECU. Embodiments are not so limited, however, and in some embodiments, when the signal is received from the voltage regulator(s) 324, the signal can include a predetermined amount of power supply noise.

Continuing with this non-limiting example, the second processing device can determine the susceptibility to the injected noise exhibited by at least one of the vehicle components as part of performance of a functional safety operation associated with a vehicle (e.g., the vehicle 641 illustrated in FIG. 6, herein) in which the ECU 301 is deployed.

In some embodiments, the second processing device can monitor temperature characteristics of at least one of the vehicle components and determine that at least one of the vehicle components is operating outside a particular temperature range. The second processing device can then transmit signaling indicative of the determination that at least one of the vehicle components is operating outside the particular temperature range to the first processing device and the first processing device can alter a workload associated with at least one of the vehicle components responsive to receipt of the signaling indicative of the determination that at least one of the vehicle components is operating outside the particular temperature range. In some embodiments, the first processing device can alter the workload by controlling a quantity of commands transferred to the vehicle components, a frequency of issuing commands to the vehicle components, and/or a priority of application execution of the vehicle components, among other factors that can contribute to the workloads experienced by the vehicle components.

FIG. 4 illustrates an example electronic control unit 401 in accordance with some embodiments of the present disclosure. As shown in FIG. 4, an electronic control unit 401 may include a host processing device 402 coupled to a number of components 418-1 and 418-2 (referred to collectively as the components 418). Each component 418-1 and 418-2 may include a safety processing device 420-1 and 420-2. For example, the safety processing device 420-1 may be embedded in component 418-1. As such, the safety processing devices 420-N may monitor characteristics, predict failure in time rates, and/or calculate threat levels of a component 418 using circuitry resident on the component 418.

Although only two components 418-1 and 418-2 and only two safety processing devices 420-1 and 420-2 are shown in FIG. 4, embodiments of the present disclosure are not so limited. For example, embodiments of the present disclosure could include three or more components 418 and/or three or more safety processing devices 420.

As shown in FIG. 4, each of the components 418-1, 418-2 includes a memory device 421-1, 421-2. As used herein, the term "memory device" may be interchangeable with the term "memory component" and may refer to any device design to store data and/or preserve it for retrieval. Memory devices may be volatile or non-volatile.

Examples of non-volatile memory devices include, but are not limited to, not-and (NAND) type flash memory. NAND type flash memory includes, for example, two-dimensional NAND (2D NAND) and three-dimensional NAND (3D NAND). Non-volatile memory devices can be other types of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM), "emerging" memory devices such as resistance variable (e.g., 3-D Crosspoint (3D XP)) memory devices, memory devices that include an array of self-selecting memory (SSM) cells, etc., or any combination thereof.

Resistance variable memory devices can perform bit storage based on a change of bulk resistance, in conjunction with a stackable cross-gridded data access array. Additionally, in contrast to many flash-based memories, resistance variable non-volatile memory can perform a write in-place operation, where a non-volatile memory cell can be programmed without the non-volatile memory cell being previously erased. In contrast to flash-based memories and resistance variable memories, self-selecting memory cells can include memory cells that have a single chalcogenide material that serves as both the switch and storage element for the memory cell.

Examples of volatile memory devices can be, but are not limited to, random access memory (RAM), such as dynamic random access memory (DRAM), static random access memory (SRAM), synchronous dynamic random access memory (SDRAM), and/or restrictive DRAM (RDRAM), among others.

Figure 5:
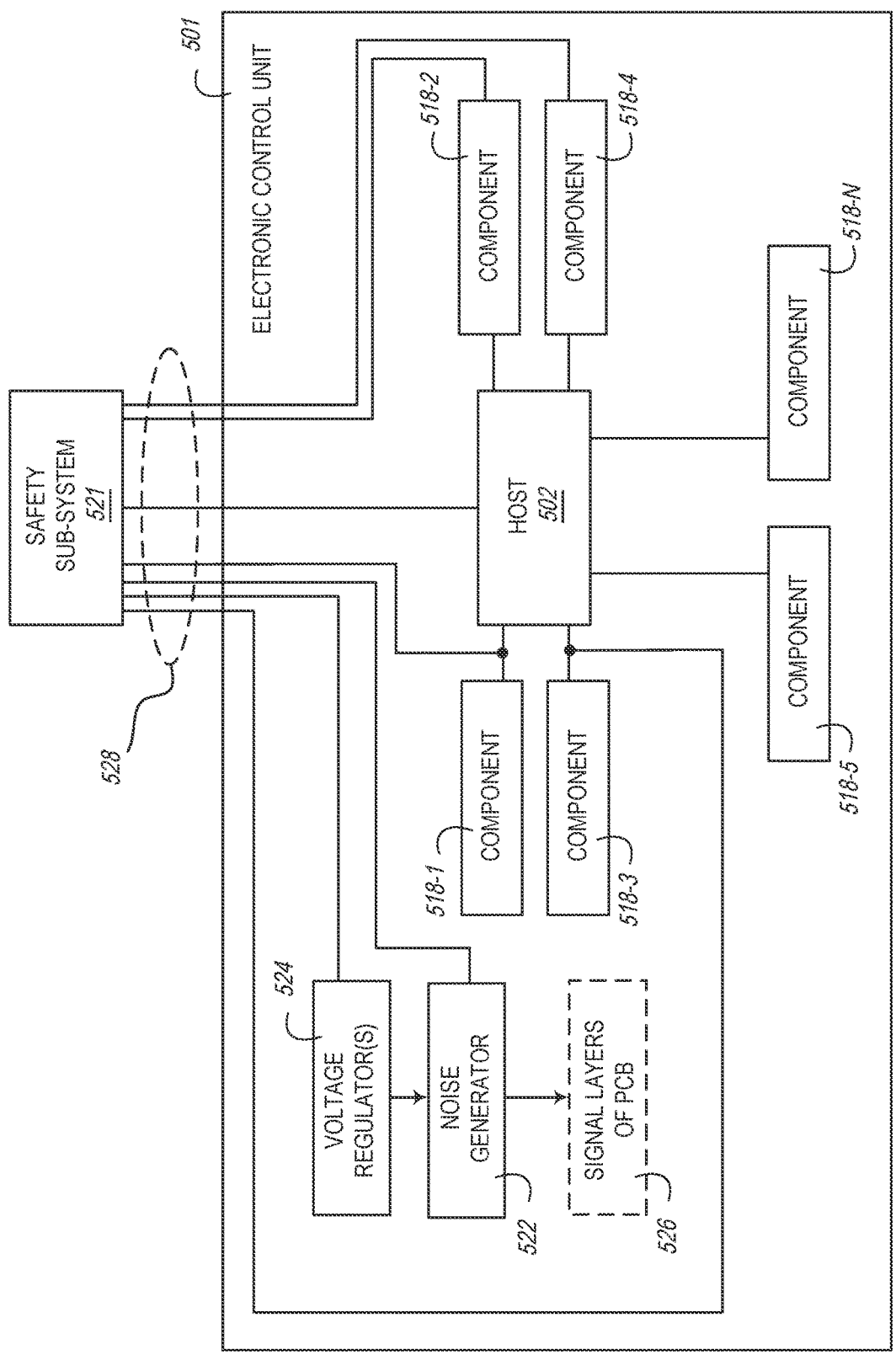
FIG. 5 illustrates another example electronic control unit in accordance with some embodiments of the present disclosure.

FIG. 5 illustrates another example electronic control unit 501 in accordance with some embodiments of the present disclosure. As shown in FIG. 5, the electronic control unit (ECU) 501 includes a safety sub-system 521 coupled to one or more components 518-1, . . . , 518-N. Each of the components 518 may be coupled to a host processing device 502 of the ECU 501. The safety sub-system 521 may monitor functional safety risks of the ECU 501 by monitoring characteristics of components 518. The safety sub-system 521 may include a safety processing device analogous to safety processing devices 120, 220, 320, and 420 of FIGS. 1-4. As such, the safety sub-system 521 may be coupled to the host processing device 502 to allow the safety sub-system 521 to communicate functional safety risks to the host processing device 502.

In some embodiments, the safety sub-system 521 may be removably coupled to the components 518, host processing device 502, noise generator 522, and/or voltage regulator(s) 524. This can facilitate implementation, maintenance, and customization of safety sub-system 521. For example, by allowing for the safety sub-system 521 to be removably coupled to the components 518, the safety sub-system 521 can be removed from a vehicle (e.g., the vehicle 641 illustrated in FIG. 6, herein) to allow for troubleshooting, triage, and/or replacement of the safety sub-system 521 without necessitating that the vehicle is physically brought to a location that can perform troubleshooting, triage, and/or replacement of the safety sub-system 521.

An interface 528 may be used to transmit data between the ECU 501 and the safety sub-system 521. Interface 528 may be, for example, a physical host interface. Examples of a physical host interface include, but are not limited to, a serial advanced technology attachment (SATA) interface, a PCIe interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), (ONFI), Double Data Rate (DDR), Low Power Double Data Rate (LPDDR), high-speed interface, or any other interface. Embodiments are not so limited, however, and in some embodiments, the interface 528 can be a virtualized interface (e.g., a virtualized network interface controller) or a wireless interface, such as an interface that is configured to communicate using an IEEE 802 protocol (e.g., Wi-Fi, Bluetooth, etc.).

As shown in FIG. 5, the ECU 501 may receive inputs from a safety sub-system 521. Although not shown in FIG. 5, the ECU 501 may receive other inputs from parts of the vehicle other than the safety sub-system 521 according to the ECU's intended function(s). For example, an ECU 501 intended to control the deployment of vehicle airbags may receive inputs from sensors detecting crashes and other sensors detecting whether a load has been placed on a particular seat.

As shown in FIG. 5, the ECU 501 may include a host processing device 502, which may be physically, electrically, or otherwise coupled to components 518 and configured to receive a signal from at least one component 518. The host processing device 502 may then transmit the signal to the safety sub-system 521. In some embodiments, the host processing device 502 may transmit the signal directly to a safety processing device (e.g., the safety processing device 120, 220, 320, 420 illustrated in FIGS. 1-4, herein) of the safety sub-system 521.

The safety sub-system 521 may receive the signal and determine, based on the signal, a threat level of the component 518. The safety sub-system 521 may then determine whether the threat level exceeds a threshold threat level for the component 518. Responsive to determining that the threat level of the component 518 meets or exceeds a threshold threat level, the safety sub-system 521 may transmit another signal to the host processing device 502. In some embodiments, the safety sub-system 521 may be able to communicate wirelessly (e.g., by the use of electromagnetic radiation waves with wavelengths having a particular set of wavelengths associated therewith) with the host processing device 502 such that communication between the safety sub-system 521 and the host processing device 502 may continue even after the safety sub-system 521 is no longer physically coupled to the ECU 501 or host processing device 502.

Although not explicitly shown in FIG. 5, the host processing device 502 may be physically coupled to a circuit board (e.g., the signal layers of the PCB 526). In at least one embodiment, the safety sub-system 521 or components of the safety sub-system 521 may be removably coupled to that circuit board. In addition, the ECU 501 illustrated in FIG. 5 can include a noise generator 522 and/or voltage regulator(s) 524, which can be analogous to the noise generator 322 and/or the voltage regulator(s) 324 illustrated in FIG. 3, herein.

Figure 6:
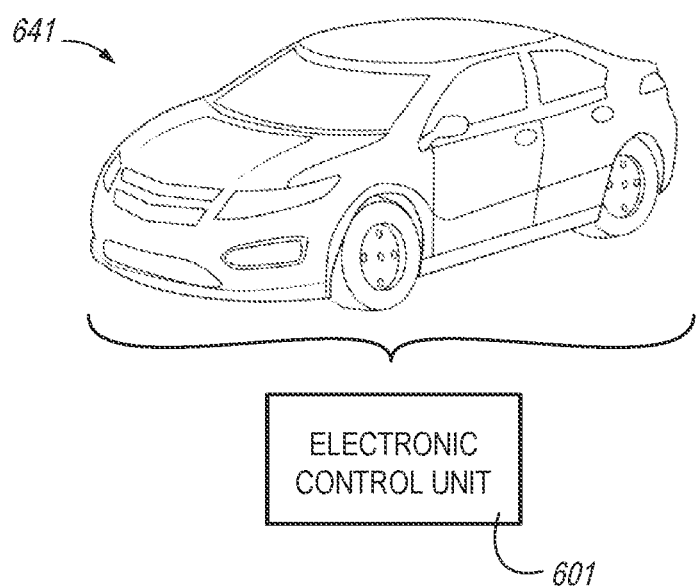
FIG. 6 illustrates an example vehicle including an electronic control unit in accordance with some embodiments of the present disclosure.

FIG. 6 illustrates an example vehicle 641 including an electronic control unit 601 in accordance with some embodiments of the present disclosure. As illustrated in FIG. 6, in some embodiments, the ECU 601 may be an ECU of a vehicle 641. As described previously herein, the ECU 601 may be an embedded system of a vehicle 641 responsible for controlling a specific function of the vehicle 641. The ECU 601 may control that control that function, for example, by controlling one or more vehicle sub-systems responsible for that function. For example, an ECU 601 may be an Infotainment Control Module (ICM) designed to control infotainment functions of the vehicle (e.g., communicating messages to users regarding operational safety as described herein, playing audio or connecting to Bluetooth devices) by controlling an infotainment sub-system of the vehicle 641.

As mentioned above, in embodiments in which the vehicle 641 is an autonomous vehicle 641, the autonomous vehicle can be a vehicle such as a car, truck, bus, motorcycle, moped, all-terrain vehicle, military vehicle, tank, etc. in which at least a portion of the decision-making and/or control over vehicle operations is controlled by computer hardware and/or software, as opposed to a human operator. Accordingly, the quickness with which an autonomous vehicle (e.g., the vehicle 641) must be able to make an accurate determination with respect to operations of the various components and circuitry associated therewith can be paramount to provide a safe operating experience for an operator of the autonomous vehicle. In order to facilitate a safe operating experience of the autonomous vehicle, the vehicle-based safety processor described herein can be operated in accordance with the embodiments of the disclosure.

As described herein, in some embodiments, the ECU may house certain devices (e.g., safety processing device 120 of FIG. 1 and/or host processing device 102 of FIG. 1) configured to monitor characteristics of components of the vehicle 641 and calculate a threat level (or likelihood of failure) of each of the components. Responsive to determining that a threat level is above a threshold threat level for that component, the devices can be configured to communicate the threat to a user of the vehicle 641 and instruct the user to take the vehicle 641 for maintenance.

FIG. 7. illustrates an example process 750 for a vehicle-based apparatus for noise injection and monitoring in accordance with one or more embodiments of the present disclosure. The process 750 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the process 750 is performed by the safety processing device 120 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 751, the process 750 includes receiving, by a processing device resident on an electronic control unit (ECU) of a vehicle, first signaling that includes a controlled amount of noise as part of performing a functional safety operation involving the vehicle. The ECU can be analogous to the ECU 101/201/301/401/501/601 illustrated in FIGS. 1-6, while the vehicle can be analogous to the vehicle 641 illustrated in FIG. 6, herein. In some embodiments, the process 750 includes receiving the first signaling from a noise generator (e.g., the noise generator 322 illustrated in FIG. 3, herein) or a voltage regulator (e.g., the noise generator 324 illustrated in FIG. 3, herein), or both, via a high speed interface coupling the noise generator and the voltage regulator to a processing device.

At operation 752, the process 750 includes processing the first signaling that includes the controlled amount of noise to generate second signaling that includes the controlled amount of noise. For example, the first processing device can receive the first signaling and perform operations on the first signaling to generate second signaling that includes the controlled amount of noise (or a portion thereof) indicative of the controlled amount of noise associated with the first signaling.

At operation 753, the process 750 includes applying the second signaling that includes the controlled amount of noise to a plurality of vehicle components coupled to the ECU. As described above, the vehicle components (e.g., the components 118/218/318/418/518 illustrated in FIGS. 1-5, herein) can include active vehicle safety components, passive vehicle safety components, and/or infotainment components.

At operation 754, the process 750 includes monitoring behavior of the plurality of vehicle components in response to the applied second signaling that includes the controlled amount of noise. As described above, the controlled amount of noise can be radio frequency noise, power supply noise, voltage fluctuation noise, or other intentionally imperfect signals generated by the noise generator and/or the voltage regulator(s) injected into the ECU via the first processing device.

At operation 755, the process 750 includes determining, in response to the applied second signaling that includes the controlled amount of noise, whether the behavior of the plurality of vehicle components is indicative of a susceptibility to the controlled amount of applied noise that meets or exceeds a threshold noise susceptibility parameter.

At operation 756, the process 750 includes transmitting, to a different processing device resident on the ECU, third signaling indicating that the behavior of the plurality of vehicle components is indicative of the susceptibility to the controlled amount of applied noise that meets or exceeds the threshold noise susceptibility parameter when the susceptibility to the controlled amount of applied noise meets or exceeds the threshold noise susceptibility parameter.

In some embodiments, the process 750 can include performing the functional safety operation involving the vehicle during idle time of the processing device or the different processing device, or both. For example, as described above, the functional safety operation can be performed as part of a background operation involving the processing device or the different processing device, or both as opposed to a foreground operation in which the safety processor 120/220/320/420 illustrated in FIGS. 1-4 and/or the host processing device 102/202/302/402/502 illustrated in FIGS. 1-5 is executing standard operation commands that are not related to the functional safety operation. Embodiments are not so limited, however, and, as described above, performance of the functional safety operation can be interlaced with host system operations.

The process 750 can further include determining a threat level corresponding to at least one component of the plurality of vehicle components based on the determined susceptibility to the controlled amount of applied noise for the at least one vehicle component and determining whether the threat level meets or exceeds a threshold threat level for the at least one vehicle component. In such embodiments, the process 750 can further include transmitting, to the different processing device, the third signaling, wherein the third signaling further comprises information corresponding to whether the determined threat level meets or exceeds the threshold threat level for the at least one vehicle component.

In some embodiments, the process 750 can include monitoring temperature characteristics of the plurality of vehicle components and determining that at least one vehicle component among the plurality of vehicle components is operating outside a particular temperature range. The process 750 can further include transmitting signaling indicative of the determination that the at least one vehicle component is operating outside the particular temperature range to the different processing device and altering, by the different processing device, a workload associated with the at least one vehicle component responsive to receipt of the signaling indicative of the determination that the at least one vehicle component is operating outside the particular temperature range.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a first processing device coupled to a plurality of components; and
a second processing device coupled to the plurality of components, wherein the second processing device is configured to:
inject noise into at least one component among the plurality of components;
monitor behavior of the at least one component in response to the injected noise;
determine, based, at least in part, on the monitored behavior of the at least one component responsive to the injected noise, a susceptibility to the injected noise exhibited by the at least one component; and
transmit signaling indicative of the determined susceptibility to the injected noise exhibited by the at least one component to the first processing device.

2. The apparatus of claim 1, wherein the second processing device is further configured to:
determine whether the susceptibility to the injected noise exhibited by the at least one component meets or exceeds a threshold noise susceptibility parameter; and transmit the signaling indicative of the determined susceptibility to the injected noise exhibited by the at least one component to the first processing device in response to a determination that the susceptibility to the injected noise exhibited by the at least one component meets or exceeds the threshold noise susceptibility parameter.

3. The apparatus of claim 1, wherein the noise is generated by a noise generator coupled to the second processing device, and wherein the noise comprises radio frequency noise.

4. The apparatus of claim 1, wherein the noise is generated by a voltage regulator coupled to the second processing device, and wherein the noise comprises one or more voltage fluctuations associated with a power supply voltage provided to the apparatus.

5. The apparatus of claim 1, wherein the first processing device, the second processing device, and the plurality of components are resident on an electronic control unit (ECU) of a vehicle, and wherein the ECU is communicably coupled to a user interface of the vehicle.

6. The apparatus of claim 1, wherein components among the plurality of components comprise active vehicle safety components, passive vehicle safety components, or infotainment components, or any combination thereof.

7. The apparatus of claim 1, wherein the second processing device is configured to the inject noise into the at least one component, monitor the behavior of the at least one component in response to the injected noise, determine the susceptibility to the injected noise exhibited by the at least one component, and transmit the signaling indicative of the determined susceptibility to the injected noise exhibited by the at least one component to the first processing device as part of performance of a functional safety operation associated with a vehicle.

8. A system, comprising:
an electronic control unit (ECU) comprising a first processing device and a second processing device;
a plurality of vehicle components coupled to the second processing device; and
at least one of a noise generator or a voltage regulator, or both, coupled to the second processing device, wherein the second processing device is configured to:
receive a signal comprising a predetermined amount of noise from the noise generator or the voltage regulator, or both;
inject noise corresponding to the received signal to at least one vehicle component among the plurality of vehicle components;
monitor behavior of the at least one vehicle component in response to the injected noise;
determine, based, at least in part, on the monitored behavior of the at least one vehicle component responsive to the injected noise, a susceptibility to the injected noise exhibited by the at least one vehicle component; and
transmit signaling indicative of the determined susceptibility to the injected noise exhibited by the at least one vehicle component to the first processing device.

9. The system of claim 8, wherein, when the signal is received from the noise generator, the signal comprises a predetermined amount of radio frequency noise.

10. The system of claim 8, wherein, when the signal is received from the voltage regulator, the signal comprises a predetermined voltage fluctuation involving a power supply of the ECU.

11. The system of claim 8, wherein, when the signal is received from the voltage regulator, the signal comprises a predetermined amount of power supply noise.

12. The system of claim 8, wherein vehicle components among the plurality of vehicle components comprise active vehicle safety components, passive vehicle safety components, or infotainment components, or any combination thereof.

13. The system of claim 8, wherein the second processing device is configured to determine the susceptibility to the injected noise exhibited by the at least one vehicle component as part of performance of a functional safety operation associated with a vehicle in which the ECU is deployed.

14. The system of claim 8, wherein the second processing device is further configured to: monitor temperature characteristics of the at least one vehicle component;
determine that the at least one vehicle component is operating outside a particular temperature range; and
transmit signaling indicative of the determination that the at least one vehicle component is operating outside the particular temperature range to the first processing device, and wherein the first processing device is configured to:
alter a workload associated with the at least one vehicle component responsive to receipt of the signaling indicative of the determination that the at least one vehicle component is operating outside the particular temperature range.

15. A method, comprising:
receiving, by a processing device resident on an electronic control unit (ECU) of a vehicle, first signaling that includes a controlled amount of noise as part of performing a functional safety operation involving the vehicle;
processing the first signaling that includes the controlled amount of noise to generate second signaling that includes the controlled amount of noise;
applying the second signaling that includes the controlled amount of noise to a plurality of vehicle components coupled to the ECU;
monitoring behavior of the plurality of vehicle components in response to the applied second signaling that includes the controlled amount of noise;
determining, in response to the applied second signaling that includes the controlled amount of noise, whether the behavior of the plurality of vehicle components is indicative of a susceptibility to the controlled amount of applied noise that meets or exceeds a threshold noise susceptibility parameter; and
transmitting, to a different processing device resident on the ECU, third signaling indicating that the behavior of the plurality of vehicle components is indicative of the susceptibility to the controlled amount of applied noise that meets or exceeds the threshold noise susceptibility parameter when the susceptibility to the controlled amount of applied noise meets or exceeds the threshold noise susceptibility parameter.

16. The method of claim 15, further comprising receiving the first signaling from a noise generator or a voltage regulator, or both, via a high speed interface coupling the noise generator and the voltage regulator to the processing device.

17. The method of claim 15, further comprising performing the functional safety operation involving the vehicle during idle time of the processing device or the different processing device, or both.

18. The method of claim 15, further comprising:
- determining a threat level corresponding to at least one component of the plurality of vehicle components based on the determined susceptibility to the controlled amount of applied noise for the at least one vehicle component;
- determining whether the threat level meets or exceeds a threshold threat level for the at least one vehicle component; and
- transmitting, to the different processing device, the third signaling, wherein the third signaling further comprises information corresponding to whether the determined threat level meets or exceeds the threshold threat level for the at least one vehicle component.

19. The method of claim 15, further comprising:
- monitoring temperature characteristics of the plurality of vehicle components;
- determining that at least one vehicle component among the plurality of vehicle components is operating outside a particular temperature range;
- transmitting signaling indicative of the determination that the at least one vehicle component is operating outside the particular temperature range to the different processing device; and
- altering, by the different processing device, a workload associated with the at least one vehicle component responsive to receipt of the signaling indicative of the determination that the at least one vehicle component is operating outside the particular temperature range.

20. The method of claim 15, wherein vehicle components among the plurality of vehicle components comprise active vehicle safety components, passive vehicle safety components, or infotainment components, or any combination thereof.

* * * * *